Oct. 16, 1962     J. H. REESE     3,058,292

BALANCE WHEEL COIL MOUNTING ASSEMBLY

Filed June 7, 1957

*INVENTOR*

JAMES H. REESE

BY     *M. Gould*

*ATTORNEY*

United States Patent Office 3,058,292
Patented Oct. 16, 1962

3,058,292
BALANCE WHEEL COIL MOUNTING ASSEMBLY
James H. Reese, Manheim, Pa., assignor to Hamilton Watch Company, Lancaster, Pa., a corporation of Pennsylvania
Filed June 7, 1957, Ser. No. 664,206
1 Claim. (Cl. 58—28)

This invention relates to electric watches and more particularly relates to an improved coil assembly and method of mounting the same.

In electric wrist watches of the type disclosed in assignee's co-pending applications Serial Nos. 578,843 and 578,844, filed April 17, 1956, now Patents Nos. 2,972,745 and 2,954,664 respectively, there are disclosed electric wrist watches in which the balance wheel carries a sector shaped coil which is periodically energized as it passes through a magnetic field in order to impulse the balance wheel to drive the train. In the watch shown in application Serial No. 578,844, now Patent No. 2,954,664, the coil is mounted on the balance wheel by means of a pair of brackets which are cemented to the coil and then attached to the balance wheel by screws. These brackets must be accurately located on the coils and care must be exercised in the cementing operation since a failure of the cement joint in either bracket will allow one end of the coil to drop, thereby stopping the watch. Because of the small size of the balance wheels utilized in wrist watches the brackets are quite tiny so that extreme care is necessary in assembling the coil and bracket arrangements.

According to the present invention it has now been found that the mounting of such coils upon balance wheels or balance assemblies may be materially expedited if the coils are mounted in a peripheral ring which carries the brackets integrally therewith. Attachment of the coils to the balance wheel then consists merely of the steps of cementing the coil within the ring with a suitable adhesive and securing the ring to the balance wheel. The tweezer work in accurately cementing the brackets to the coil is eliminated and the coil is protected by the ring. The brackets may consist of struck-out portions of the ring itself or may be separate members welded to the ring.

It is accordingly a primary object of the present invention to provide an improved coil and balance wheel assemblage for electric watches.

It is another object of the invention to provide an improved method of mounting a coil on a balance wheel for an electric watch.

It is another object of the invention to provide an improved coil and balance wheel assemblage for an electric watch wherein the coil is mounted within a peripheral ring attached to the balance wheel.

It is another object of the invention to provide an improved coil and balance wheel assemblage for an electric watch in which the coil is mounted in a peripheral ring having a pair of brackets extending therefrom and connected to the rim of a balance wheel.

It is another object of the invention to provide an improved method for mounting a coil upon the balance wheel of an electric watch comprising the steps of inserting the finished coil within a peripheral ring having brackets attached thereto and then securing these brackets to the balance wheel.

It is another object of the invention to provide a peripheral ring about a coil to be carried by a balance wheel of a watch, which will protect the edges of the coil from abrasion during any subsequent handling of the coil.

These and further objects and advantages of the invention will become more apparent upon reference to the following specification and claim and appended drawings wherein:

Figure 1:
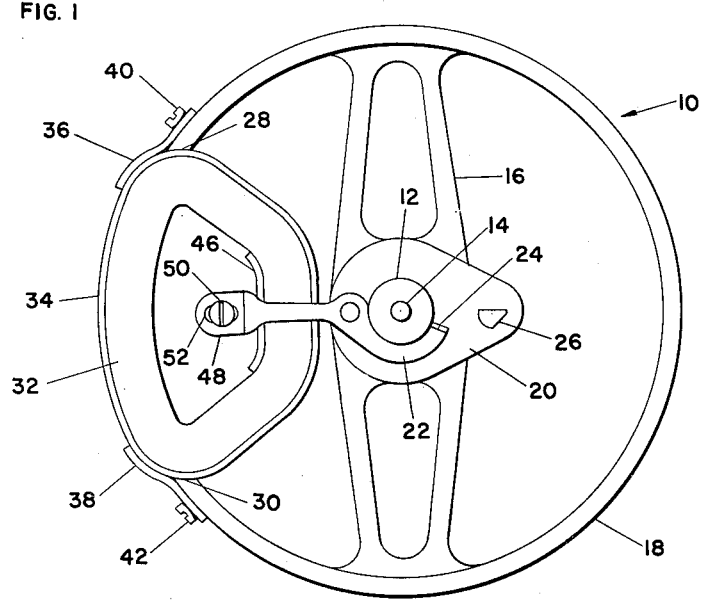
FIGURE 1 is a plan view showing a balance wheel and coil assemblage constructed according to one embodiment of the present invention.
Figure 2:
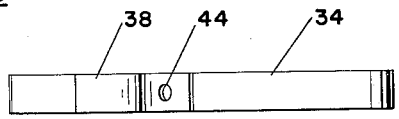
FIGURE 2 is a side elevation of the ring shown in FIGURE 1.

Referring to FIGURES 1 and 2, there is shown a balance wheel 10 having a hub 12 mounted on a balance staff 14. A cross bar 16 extends radially from the hub 12 and supports a rim 18. A roller 20 is carried on the balance staff above the cross bar 16 and supports a contact strip 22. The contact strip 22 terminates at one end in an upstanding contact finger 24 and the roller 20 carries a jewel pin 26 adjacent to this contact finger, as is described in further detail in assignee's co-pending application Serial No. 551,791, filed December 8, 1955, now Patent No. 2,954,663.

The rim 18 of balance wheel 10 is cut away at 28 and 30 to receive a sector shaped coil 32 which is mounted within a similarly shaped conductive metal ring 34 which engages the cut away portions 28 and 30 of the rim 18. In the embodiment of the invention shown in FIGURE 1, the ring 34 is provided with a pair of brackets 36 and 38 secured thereto in any suitable manner, such as by welding, and these are attached to the ends of the rim 18 by means of screws 40 and 42. These screws pass through holes 44 in the brackets 36 and 38 and screw threadedly engage threaded holes in the rim 18.

Cemented to the inside of the coil 32 is an elongated bracket 46 to which the inner end of the coil is connected. This bracket is attached to an arm 48 of contact strip 22 by means of a screw 50 passing through a slot 52, as pointed out in further detail in assignee's aforementioned co-pending application Serial No. 551,791.

The ring 34 may be mass produced with brackets 36 and 38 attached thereto in a semi-automatic fashion by means of a jig and welding machinery. The assembly of the coil and balance wheel unit may then be carried out by a worker coating the periphery of the coil with cement and then inserting it within the ring 34. A large number of coils may be mounted within rings in this manner in a short period of time by a worker whose sole job is the assemblage of coil and ring assemblies. The rings may then be attached to balance wheels by another worker who simply inserts screws 40 and 42. The outer terminal of the coil 32 may be connected to the ring 34 to form a convenient connection with the rim of the balance wheel. The ring 34 may be sufficiently oversized to take care of any slight variation in coil shapes and sizes with the adhesive filling any free space thus created.

Figure 3:
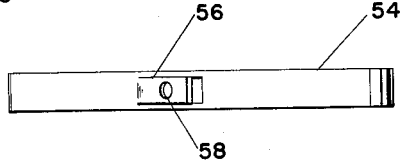
FIGURE 3 is a side elevation of another embodiment of a ring constructed according to the invention.

While the embodiment of ring shown in FIGURES 1 and 2 has separate brackets 36 and 38 attached thereto, it is also a feature of the invention that the brackets may be made from the material of the ring itself as is shown in FIGURE 3. Referring to that figure there is shown a ring 54 having a pair of fingers 56 struck therefrom and provided with holes 58. The fingers 56 serve as brackets for attaching the ring to the balance wheel in the manner shown in FIGURE 1.

Coils mounted on balance wheels in this manner are more strongly attached thereto than are coils which are merely cemented to relatively small brackets at the outer corners thereof. Further, the coils are protected by the peripheral ring which also serves as a convenient connection for connecting the outer terminal of the coil to the balance wheel. The use of such a ring in assembling coils and balance wheels reduces assembly time and eliminates the precision formerly necessary in attaching brackets to the coil by means of cement. As a result, when the method of the invention is used, the cost of the coil and balance wheel assemblages is reduced and the resultant assemblages are stronger and less susceptible to damage than those heretofore utilized.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein.

What is claimed and desired to be secured by the United States Letters Patent is:

A coil and balance wheel assembly for an electric watch comprising a balance wheel consisting of an outer annular rim and at least one cross bar connecting opposite sides of said rim, a balance staff carrying a roller plate passing through the center of said cross bar and secured thereto, a contact strip carried by said roller plate, said rim having a portion cut away to define spaced rim ends, a sector-shaped coil received between said spaced ends of said rim, said coil being surrounded by an electrically conductive metallic ring secured to said coil, a pair of brackets on said ring connecting said coil to said rim, an electrically conductive contact bracket secured to the inner surface of said coil and electrically connected to said coil, and substantially rigid electrically conductive means connecting said contact bracket to said contact strip.

References Cited in the file of this patent

UNITED STATES PATENTS

| | | |
|---|---|---|
| 1,398,372 | Gowen | Nov. 29, 1921 |
| 1,717,521 | Reichmann | June 18, 1929 |
| 2,032,889 | Ruckelshaus | Mar. 3, 1936 |
| 2,385,252 | Bennet | Sept. 18, 1945 |
| 2,432,194 | Hanchett | Dec. 9, 1947 |
| 2,883,827 | Ensign et al. | Apr. 28, 1959 |

FOREIGN PATENTS

| | | |
|---|---|---|
| 21,616 | France | Aug. 24, 1920 |
| | (1st addition to 494,398) | |
| 764,450 | Great Britain | Dec. 28, 1956 |